July 22, 1969     H. F. STOKES, JR., ET AL     3,457,365
HIGH RESOLUTION TELEVISION PROJECTION SYSTEM
Filed Jan. 5, 1966
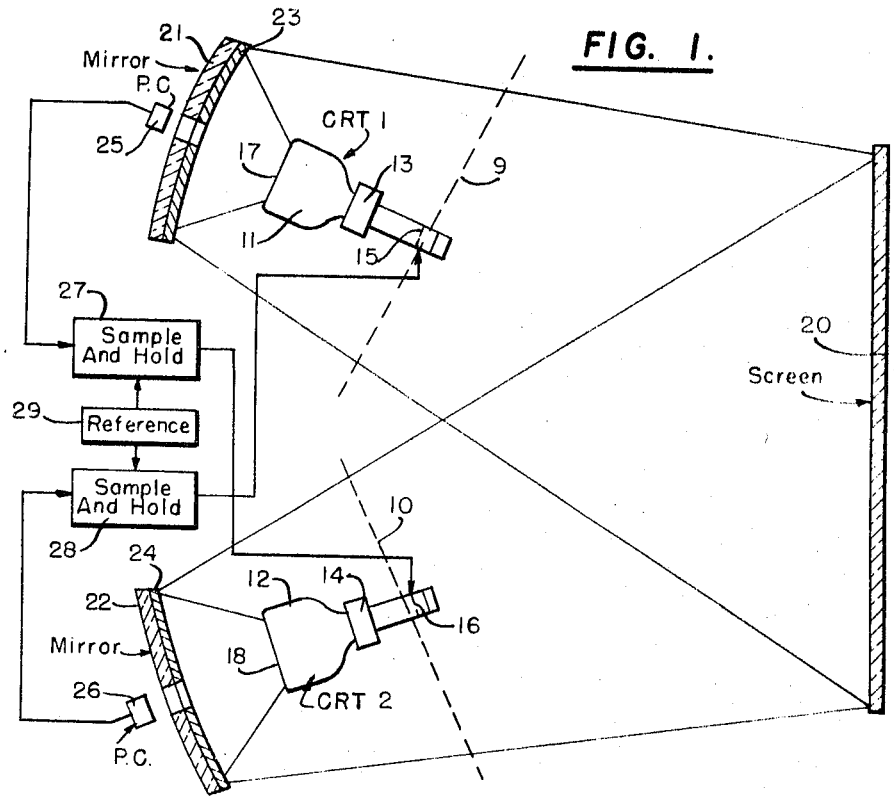
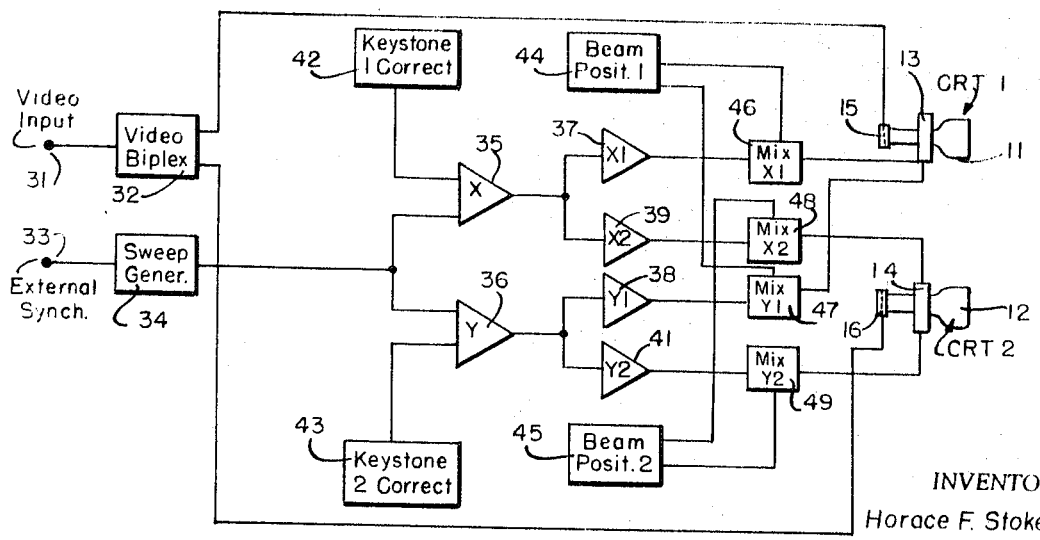
INVENTORS
Horace F. Stokes, Jr.
Vincent C. Vuolo
BY *William Grobman*
ATTORNEY

United States Patent Office 3,457,365
Patented July 22, 1969

3,457,365
HIGH RESOLUTION TELEVISION PROJECTION
SYSTEM
Horace F. Stokes, Jr., Beltsville, and Vincent C. Vuolo, Hyattsville, Md., assignors to Singer-General Precision, Inc., Binghamton, N.Y., a corporation of Delaware
Filed Jan. 5, 1966, Ser. No. 518,865
Int. Cl. H04n 5/14, 5/74
U.S. Cl. 178—6.8                                     9 Claims

ABSTRACT OF THE DISCLOSURE

A system is provided for improving the resolution of televsion systems. Two separate projection cathode ray tubes are aligned to project their images onto the same screen. Both tubes are provided with the same video signals and their sweeps are so timed that their lines are interlaced. Thus, if each tube provides an image of 500 lines, the final projected image on the screen is 1000 lines. Correction means is provided for stabilizing the intensity of the two tubes, for correcting the keystone effect of each tube image and for assuring the proper line interlacing.

---

This invention relates to television systems, and more particularly to high resolution television systems which are suitable for use in visual simulators.

In the simulation of equipment and events for training purposes, it is important that the simulation create in the student the impression of reality. Simulation is used to a great extent in the training of operators for complex or dangerous devices and operations. For example, the very nature of extra-terrestrial space travel renders the training of astronauts by actual missions highly impractical. In order to train both the operators of the spacecraft and the operators of the ground equipment, use must be made of apparatus which simulates the actual events. Since, in the operation of such apparatus, rapid reactions which are virtually instinctive often mean the difference between success and failure, it is necessary that the student being trained develop the proper habits and "instincts." To accomplish this, the equipment which is being simulated must operate in a realistic manner so that the responses evoked in the student are true and proper.

In spite of recent developments in automation, and the design and successful operation of automatically controlled equipment for many different types of complex operations, and in spite of the advances made in radio navigational equipment and radar, sight is still depended upon to a very great extent by men. In fact, in the recent rendezvous in space of two United States space vehicles, the men involved used visual sighting to a substantial extent. For this reason, even though the electrical and electronic instrumentation and equipment is accurately simulated, visual simulation also becomes important in training operators of complex equipment and devices.

Because visual simulation in the training of operating personnel has required that the simulated images respond in a realistic manner to the actions of the student and instructor, the generation of images by television systems has been extensively used. One of the primary reasons for utilizing television image generation is the ease with which the electrical potentials controlling the size, the shape, the position and the orientation of the images can be modified. It is relatively easy to cause a television image to move or to change its size. Similar variations in optically produced images are much more difficult to achieve. However, one of the basic problems with the generation of images by television devices has been the poor resolution and the visibility of the raster. It is difficult to make a television image appear realistic for this reason. The resolution of the television image can be increased by increasing the information density applied to the face of the tube. An increase in the information density requires an increase in the number of lines in the television raster. A raster of 1000 lines per frame is considered good resolution. Electronically, it is feasible to apply 1000 lines per frame, but when 1000 lines are applied to a small diameter tube, the lines tend to bleed together, to over-lap, and the contrast is lost. Good resolution is not reduced by over-lapping adjacent sweeps. A 1000 line frame operates reasonably well on a tube having a large diameter, but the optics involved in utilizing the picture which appears on the face of the large tube are complex and very expensive because of the size of the elements involved. It would be preferable to provide a high resolution system which utilizes a large number of lines per frame in a small diameter projection tube.

It is, therefore, an object of this invention to provide a new and improved visual simulator utilizing television image generation.

It is another object of this invention to provide a new and improved television generation and projection system for visual simulation.

It is a further object of this invention to provide a new and improved high resolution television system.

It is still another object of this invention to provide a new and improved television system with increased resolution which employs a large number of sweeps per frame.

Other objects and advantages of this invention will become more apparent as the following description proceeds, which description should be considered together with the accompanying drawings, in which:

FIG. 1 represents a diagrammatic illustration of the projection television system of this invention; and FIG. 2 is a block diagram of the circuits of this invention.

Referring now to FIG. 1 in detail, the reference character 11 designates the first of two cathode ray tubes and reference character 12 designates the second of the two cathode ray tubes. CRT 11 carries a deflection yoke 13 which is mounted on the neck adjacent the flare of the tube. A control grid 15 located near the small end of the neck of the tube is also shown in the tube 11 which includes face 17 on the inside of which there is a layer of electron-sensitive phosphor. CRT 12 comprises a deflection yoke 14 mounted on its neck adjacent the flare of the tube, contains a control grid 16 near the end of the neck of the tube, and includes a face 18 which comprises a thin layer of electron-sensitive phosphor on its internal surface. CRT 11 is arranged to face a spherical mirror which comprises a glass backing surface 21 having a highly reflective aluminized surface 23 to form part of a Schmidt projection system. The projection system includes a Schmidt corrector 9 mounted on the neck portion of the tube 11, and a screen 20 which may be a rear projection or semi-transparent type of screen. A similar system comprises a mirror having a glass backing surface 22 and a highly polished reflective surface 24 is mounted opposite the face 18 of the CRT 12. This projection system also includes a Schmidt corrector 10 which is mounted about the neck of the CRT 12. Adjacent the central opening of the mirror 21 is a photoelectric cell 25 aimed to pick up light from the face 17 of the CRT 11. Also mounted adjacent the opening in the mirror 21, but not shown on the drawings, may be a cooling fan which circulates air across the face 17 of the tube 11. A second photo-electric cell 26 is located adjacent the opening in the center of the mirror 22, and, it may share the opening with a fan aimed towards the face 18 of the tube 12 as mentioned above. The photo-electric cell 25 is connected to a sample-and-hold circuit 27, and the photoelectric cell 26 is connected to a sample-and-hold circuit 28. A variable reference generator 29 supplies a second input to each of the sample-and-hold circuits 27 and 28. The output from the sample-and-hold circuit 27 is connected to the control grid 16 of the tube 12, and the output from the sample-and-hold circuit 28 is connected the control grid 15 of the tube 11.

As shown in FIG. 1, the high resolution television projection system of this invention comprises two separate, individual CRT's 11 and 12. Each of the CRT's 11 and 12 has associated with it its own Schmidt projection system, but the two images projected by the separate and dependent Schmidt projection systems are combined on the surface of the single screen 20. In operation, the image which is produced upon the face 17 of the CRT 11 is projected by means of the mirror 21 through the corrector 9 onto the screen 20. Similarly, the image formed on the face 18 of the CRT 12 is projected by the mirror 22 through the corrector 10 onto the screen 20 where it is superimposed upon the image from the tube 11. Since the two images are to blend as one, they must be of substantially similar light intensities. To automatically adjust the light intensities on the faces 17 and 18 of the two CRT's 11 and 12, the photoelectric cell 25 picks up light from the face 17 of the tube 11 and the photo-electric cell 26 does the same from the face 18 of the tube 12. The light received by the photo-cells 25 and 26 is converted into electrical energy, and the electrical energy from the cell 25 is applied to the input of the sample-and-hold circuit 27, while the electrical energy from the photocell 26 is applied to the input of the sample-and-hold circuit 28. A reference potential is generated by reference circuit 29 and is applied to both of the sample-and-hold circuits 27 and 28 to serve as a datum with which the inputs from the photo-cells 25 and 26 are compared. An error voltage output is generated by each of the sample-and-hold circuits 27 and 28, and the error voltage from the circuit 27 is applied to the control grid 16 of the tube 12 to control the intensity of the beam in that tube. In the same manner, the error potential output from the circuit 28 is applied to the control grid 15 of the tube 11 to control the intensity of that beam, and therefore, the intensity of the light generated by the phosphor on the face 17. Thus, the light intensity from the two projection tubes 11 and 12 is maintained substantially the same.

As mentioned above, one of the primary objectives of this invention is to provide a television system which has very high resolution. It was indicated above that the use of a large number of lines per frame in large diameter television tubes is feasible, thereby increasing the resolution of the picture presented by these tubes. However, when large diameter CRT's are used, the associated equipment must also be large, and the cost of large diameter lenses or mirrors is extremely expensive. In fact, the cost of the optical and support equipment required in projection systems of the type disclosed in FIG. 1 increases, approximately, as the square of the diameter of the tube used. Large diameter tubes are expensive to use, and, as mentioned above, small diameter tubes suffer from the disadvantage of not being capable of using a large number of lines per frame. Thus, when a small diameter tube is used in a projection television system, the enlarged image which is projected upon the screen clearly shows the space between lines. This is not good for visual simulation systems.

The present invention resolves these two opposing situations by providing two small diameter CRT's 11 and 12 used together in a projection system to provide a single image upon a single screen 20. If the contemplated system is to use 1000 lines per frame, or a similar number of lines, and the statements made above are true, then neither of the tubes 11 or 12 could individually utilize frames which comprise 1000 lines each. In this invention, the same video information is supplied to both of the tubes 11 and 12. Each tube is provided with a raster of 500 lines, and the sweeps are so arranged that the rasters from the two tubes 11 and 12 are interlaced when projected onto the screen 20. In other words, if the sweep generation system provided for the two tubes 11 and 12 generate 1000 lines per frame, then every other sweep will be applied to the yoke 13 of the tube 11 and the alternate sweeps will be applied to the yoke 14 of the tube 12. If the picture appearing upon the face of the tube 11 or the tube 12 were separately projected onto the screen 20, the individual lines would be visible. However, when the raster of 500 lines generated in the tube 11 is projected onto the screen 20, and the raster of 500 lines generated in the tube 12 is also projected onto the screen 20, both in such a position that each line of the raster of tube 12 falls midway between two adjacent lines of the raster of the tube 11, the spacing is such that the individual lines are not clearly discernable. Since the same information is applied to both of the tubes 11 and 12, the resolution of the composite picture is far superior to that of either individual picture generated by tube 11 or 12. For this reason, the system shown in FIG. 1 for maintaining the brightness levels of the two tubes substantially the same becomes important.

FIG. 2 shows the circuitry, in block form, for accomplishing the results using the equipment shown in FIG. 1, the tubes 11 and 12 having yokes 13 and 14 and control grids 15 and 16 respectively and being shown to the right of FIG. 2. A single sweep generator 34 of any conventional type, having an external synch. terminal 33 so that it may be synchronized with the sweep of the camera and other equipment, feeds a pair of sweep amplifiers 35 and 36. The amplifier 35 amplifies the X, or horizontal, sweep potentials, and it, in turn, feeds amplifiers 37 and 39. Amplifier 37 provides the horizontal sweep for CRT 11, and amplifier 39 provides the horizontal potentials for CRT 12. Similarly, amplifier 36 feeds two amplifiers 38 and 41 which provide the vetrical or Y sweep potentials for the tubes 11 and 12 respectively. Amplifier 37 feeds one input of a mixer 46; amplifier 39 feeds one input to a mixer 48; amplifier 38 feeds one input to a mixer 47; and amplifier 41 feeds one input to a mixer 49. A beam positioner 44 supplies potentials for another input to each of the mixers, 46 and 47, and a second beam positioner 45 supplies a second input to the mixers 48 and 49. The outputs from the mixers 46 and 47 are applied to the yoke 13 of the CRT 11, and the outputs from the mixers 48 and 49 are applied to the yoke 14 of the CRT 12. In addition, a keystone corrector 42 has its output connected to the input of amplifier 35, and a second keystone corrector 43 has its output applied to the input of amplifier 36. A video input terminal 31 to which the video information is applied from the camera or other external source feeds a video biplex switch 32 which has one output connected to the control grid 15 of the CRT 11 and the other output connected to the control grid 16 of the CRT 12.

The system shown in FIG. 2 actually comprises two duplicate systems, one for CRT 11 and the other for CRT 12, each of which system has the same input signals. For this description, consider only that equipment associated with CRT 11. A signal sweep generator 34 generates sweep potentials to provide 1000 lines per frame. The sweep generator 34 is synchronized, by means of synch. signals applied to the terminal 33, with the camera, not shown, or other source of television signals. This is standard construction. The sweep generator 34, as envisioned in this description, supplies the potentials for both the X and the Y deflections. To provide isolation, the horizontal potentials are applied to the input of the amplifier 35 and the vertical deflection potentials are applied to the amplifier 36. Also to provide isolation, the output of each of the amplifiers 35 and 36 feeds two identical amplifiers 37 and 39 and 38 and 41 so that there is no crosstalk between the yokes 13 and 14 of the two tubes 11 and 12. The horizontal sweep potentials passing through the amplifiers 35 and 37 are applied to the mixer 46 where they are combined with the beam positioning potentials generated in the beam positioner 44. The outputs of the beam positioner 44 are adjustable DC potentials which are superimposed upon the sweep potentials so as to center or otherwise position the raster for each of the tubes. The output from the mixer 46 is applied to one of the inputs to the yoke 13 of the tube 11 to supply horizontal deflection potentials and control to that yoke. In a similar manner, the outputs from the amplifier 36 supply the vertical deflection potentials through the amplifier 38 and the mixer 47 to the other input of the yoke 13. The DC outputs from the beam positioner 44 are also applied to the mixer 47 so that control of the potentials generated in the beam positioned 44 modifies both the vertical and the horizontal deflection potentials to completely position the raster on the face of the tube 11. Since, as shown in FIG. 1, the tube 11 projects its image at an angle towards the screen 20, one portion of the raster is farther from the screen 20 than another, and this produces a raster which has a generally keystone shape. The keystone control 42 applies correction signals to the amplifier 35 to correct for variations in the horizontal sweep potentials to compensate for this effect. When the arrangement is such that the vertical deflection potentials also require a similar correction, the output from the keystone corrector 43 provides these correction potentials.

In the operation of the over-all system, the image which is formed on the faces 17 and 18 of the two CRT's 11 and 12 are enlarged and projected by means of the projection systems which comprise the mirrors 21 and 22 and correctors 9 and 10, onto the screen 20. The CRT's 11 and 12 are so positioned that the image generated on the face of each of these tubes fills the screen 20. As mentioned above, the lines of the individual rasters of the two tubes 11 and 12 are interlaced so that one line from one raster falls between two immediately adjacent lines of the other raster. Thus, the composite image on the screen 20 consists of twice as many lines as the raster of either individual tube 11 or 12 contains. A single sweep generator 34 generates the sweep potentials to provide 1000 lines per frame. The video information is applied through terminal 31 into a video switch 32 which supplies the video information to the tubes 11 and 12 and also has the function of alternately providing the control grids 15 and 16 with blanking potentials. While the information is being applied from the switch 32 to the control grids 15 and 16 of the tubes 11 and 12, a blanking potential is being applied by the switch 32 to the one of the control grids. During any sweep generated by the sweep generator 34, one of the tubes 11 or 12 has its beam cut off. The end result is that although the same sweep potentials are being simultaneously applied to the two tubes 11 and 12, the beam of only one tube is writing on the face of that tube during any single sweep. The biplexing switch 32 is controlled in its action by the sweep generator 34 so that at the termination of each sweep potential, the switch 32 changes to its opposite condition.

As mentioned above in connection with the description of FIG. 2, X and Y positioning potentials are superimposed upon the sweep potentials in the mixers 46, 47, 48 and 49 by the two beam positioners 44 and 45. This permits proper positioning, electrically, of the projected images from the two tubes 11 and 12 so that they are properly located on the screen 20. The electrical adjustment is preferable since once the tubes 11 and 12 together with their individual projection systems are physically mounted, further mechanical adjustment is unhandy and complex. Similarly, the correction for the distortion produced by the angular relationships of the faces 17 and 18 of the tubes 11 and 12 with the screen 20, known as keystone effect, has been discussed above. Since the images produced by the two tubes 11 and 12 are superimposed, in a sense, it is important, if a believable image is to be formed on the screen 20, that the brightness of the two images be essentially the same. For this reason, a photo-sensitive device 25 is positioned to be irradiated by the light generally formed on the face 17 of the tube 11 and a similar photo-sensitive element 26 is situated to pick up the light generated on the face 18 of the tube 12. The electrical outputs from the photo-sensitive cells 25 and 26 will vary with the intensity of the light received by them. Electrical output from the cell 25 is applied to the sample-and-hold circuit 27 in which a capacitor is charged to the potential of the output from the cell 25 and which periodically samples this potential to accommodate any variations therein. This signal is amplified and is compared with a reference signal generated by the reference circuit 29, which may be manually adjusted to determine the average brightness. The resultant output potential from the sample-and-hold circuit 27 is applied to the control grid 16 of the tube 12 to control its brightness. In a similar fashion, the potential output from the photo-sensitive cell 26 is compared with the reference potential from the reference circuit 29 in the sample-and-hold circuit 28. The output from the sample-and-hold circuit 28 is applied to the control grid 15 of the tube 11. Thus, the brightness from the tube 11 controls the voltage applied to the tube 12 to control its brightness, and the light output from the tube 12 controls, in the same manner, the brightness of the tube 11. Should the light level generated by the tube 11 increase, the potentials applied from the sample-and-hold circuit 27 to the control grid 16 of the tube 12 would cause the light output level from that tube to similarly increase. In this way, the brightness from the two tubes 11 and 12 are maintained substantially equal, and the over-all brightness of both tubes may be controlled by changing the setting of the reference circuit 29.

Although the drawings are schematic, most of the equipment shown therein is well known. Cathode ray tubes have, of course, been used for many many years in oscilloscopes as well as television systems, and projection television systems have long included Schmidt projection apparatus. The sample-and-hold circuits designated by the blocks 27 and 28 are disclosed in greater detail in patent application SN 514,524, entitled Sample and Hold Circuit, filed on Dec. 17, 1965 in the name of Robert P. Rodgers. The photo-sensitive devices 25 and 26 may be either the photo-voltaic type or the photo-resistive type and may comprise the newer semiconductor devices. Any standard sweep generator 34 may be used. The type of sweep generator depends upon the type of tubes 11 and 12 which are used. If tubes with electrostatic deflection are used then a normal saw-tooth voltage would be generated. If, however, electromagnetic deflection is used, then suitable deflection currents for this type of yoke are produced by the generator 34. These devices are very old. The biplex switch 32 also may be any well known, suitable device, and, for example, may comprise a flip-flop controlled by the sweep generator 34 and controlling, in turn, one pair of gate circuits for switching the blanking voltages alternately from one tube to the other. In a similar manner, keystone effect correctors, beam positioners and the circuits, called here mixers, for algebraically superimposing DC potentials on sweep potentials are well known in the art and have been used for many years in systems of this type.

The above specification has described a new and improved system for providing a high resolution television system in which the number of lines per frame is substantially greater than the number of lines per frame which can be reasonably well handled by a single tube. It is realized that the above description may indicate to those who are skilled in the art additional ways in which the principles of this invention may be used without departing from its spirit. It is therefore, intended that this invention be limited only by the scope of the appended claims.

What is claimed is:

1. A high resolution television system comprising a first and a second cathode ray tube, a means for generating standard sweep potentials at a frequency which is about double that which either of said first and second tubes can effectively utilize, means for applying said sweep potentials simultaneously to said first and second tubes to cause their rays to sweep rasters, means for projecting an enlarged image of the face of each of said first and second tubes onto a projection plane, means for adjusting the position of the sweep lines formed on the face of each of said first and second tubes so that they are superimposed upon each other, and means for alternately blanking out the cathode ray of said first and second tubes for every other sweep line so that one of said tubes has formed on its face the images of only the even number sweep lines and the other of said tubes has formed on its face the images of the odd number sweep lines.

2. The system defined in claim 1 in which each of said first and second cathode ray tubes comprises a deflection system and a control grid means for supplying the same video signals to said control grids, and means for supplying the sweep potentials from said generator to each of said deflection systems.

3. The system defined in claim 1 further including means for controlling the brightness of the images formed on the faces of each of said first and second tubes, said brightness control means comprising a first light sensitive element placed adjacent the face of said first tube to receive light generated thereon, means for connecting the output from said first light sensitive element to said second tube to control the brightness of the image generated thereby, a second light sensitive element positioned adjacent the face of said second tube to receive light generated thereon, means for connecting the output from said second light sensitive element to said first tube to control the brightness of the image generated thereby.

4. The system defined in claim 2 further including means for controlling the brightness of the images formed on the faces of said first and second tubes, said brightness control means comprising a first light sensitive element positioned adjacent the face of said first tube to receive light generated thereon, means for connecting the output from said first light sensitive element to the control grid of said second tube, a second light sensitive element positioned adjacent the face of said second tube to receive light generated thereon, and means for connecting the output from said second light sensitive element to the control grid of said first tube.

5. The system defined in claim 4 further including means for generating a reference potential, first means for comparing the reference potential with the output from said first light sensitive means, and means for applying the compared potentials to the control grid of said second tube.

6. The system defined in claim 5 further including means for comparing said reference potential with the output from said second light sensitive element, and means for applying the compared potentials to the control grid of said first tube.

7. The system defined in claim 2 further including means for generating X and Y potentials, means for superimposing said X and Y potentials onto said sweep potentials, and means for applying the combined sweep and X and Y potentials to the deflection systems of said first and second tubes to provide suitably positioned rasters on the faces of those tubes.

8. A high resolution television system comprising a first cathode ray tube having a first face, a first deflection system and a first control grid; a second cathode ray tube having a second face, a second ray deflection system and a second control grid; a projection screen; a first enlarging projection system for said first tube to project an enlarged image of said first face onto said screen; a second enlarging projection system for projecting an enlarged image of said second face onto said screen superimposed upon the image of said first face; a generator for producing ray sweep potentials; means for applying said sweep potentials to said first and second deflection systems to deflect the rays in said first and second tubes identically, the frequency of said sweep potentials being sufficiently high to provide each of said first and second tubes with a raster in which the individual lines merge to present an indistinct image; means for connecting a source of video signals to said first and second control grids; a switching means; means for generating blanking potentials; means for connecting said blanking potentials generator to the input of said switching means; means for connecting the output from said switching means to said first and second control grids; and means for connecting said sweep generator to said switching means to control said switching means to apply said blanking potentials alternately to said first and second control grids to alternately cut off the rays in said first and second ubes.

9. The system defined in claim 8 further including means adjacent said first face for receiving light generated thereon and for generating electrical potentials proportional thereto, means for generating a reference potential, means for comparing the output potentials from said light receiving means with the reference potential, and means for applying the resultant potential to said second control grid to control the brightness of the image generated on said second face.

References Cited

UNITED STATES PATENTS

| | | | |
|---|---|---|---|
| 2,549,585 | 4/1947 | Epstein | 178—7.88 |
| 3,200,195 | 8/1965 | Davies | 178—6.8 |
| 3,234,327 | 2/1966 | McMann | 178—6.8 |
| 2,953,964 | 9/1960 | Dresser | 250—205 |

ROBERT L. GRIFFIN, Primary Examiner

JOSEPH A. ORSINO, Jr., Assistant Examiner

U.S. Cl. X.R.

178—7.5, 7.88